United States Patent [19]
Nemeth

[11] Patent Number: 5,499,715
[45] Date of Patent: Mar. 19, 1996

[54] FLOPPY DISK CONTAINER WITH NESTING COVER

[75] Inventor: Bradley M. Nemeth, San Francisco, Calif.

[73] Assignee: Brauner-Nemeth, Inc., Palo Alto, Calif.

[21] Appl. No.: 162,587

[22] Filed: Dec. 3, 1993

[51] Int. Cl.⁶ .................................................. B65D 21/04
[52] U.S. Cl. ........................ 206/505; 206/508; 206/516; 220/4.22; 220/335
[58] Field of Search .................... 206/505, 508, 206/509, 506, 507, 514, 515, 516, 517, 518, 519, 308.1, 45.31, 45.33, 45.34; 220/335, 334, 337, 338, 4.22, 4.21, 602, 662, 665

[56] References Cited

U.S. PATENT DOCUMENTS

| | | | |
|---|---|---|---|
| 3,025,948 | 3/1962 | Appelt | 206/4 |
| 3,412,888 | 11/1968 | Andrews et al. | 206/508 |
| 4,029,234 | 6/1977 | Johnson, Jr. et al. | 220/337 |
| 4,204,609 | 5/1980 | Kuhn | 206/514 |
| 4,226,328 | 10/1980 | Beddow | 206/514 |
| 4,406,379 | 9/1983 | Anderson et al. | 220/335 |
| 4,471,880 | 9/1984 | Taylor et al. | 220/306 |
| 4,479,684 | 10/1984 | Doyel | 206/518 |
| 4,572,374 | 2/1986 | Sirotkin | 206/518 |
| 4,588,086 | 5/1986 | Coe | 206/444 |
| 4,640,416 | 2/1987 | Northrup et al. | 206/425 |
| 4,718,552 | 1/1988 | Rossi et al. | 206/444 |
| 4,848,574 | 7/1989 | Murphy et al. | 206/444 |
| 5,036,997 | 8/1991 | May et al. | 220/335 |
| 5,046,615 | 9/1991 | Nentl et al. | 206/454 |
| 5,050,734 | 9/1991 | Chen | 206/444 |
| 5,096,084 | 3/1992 | Wells | 220/4.22 |
| 5,213,226 | 5/1993 | Nichols | 220/337 |
| 5,265,725 | 11/1993 | Judd et al. | 206/519 |
| 5,344,023 | 9/1994 | Cox et al. | 206/508 |

Primary Examiner—Stephen J. Castellano
Attorney, Agent, or Firm—Townsend and Townsend and Crew

[57] ABSTRACT

A stackable container for computer media, such as floppy disks or the like. The container comprises a base and a removable cover. During ordinary use of the container, the cover fits in an upright orientation securely atop the base to provide closure of the container. The cover is constructed so that when it is removed and inverted, it nests in the base of the container. Thus, during packing and shipment (or storage) of the container, the cover is removed and inverted and nested in the base. The cover, which is typically made of clear styrene, is relatively brittle, and the ability to nest the cover in the base, which is typically made of a more resilient plastic, provides protection from physical damage to the cover during shipment. Also, the base is constructed to at least partially nest in the inverted cover, so that multiple containers can be packed and shipped more compactly.

25 Claims, 7 Drawing Sheets

FLOPPY DISK CONTAINER WITH NESTING COVER

BACKGROUND OF THE INVENTION

The present invention relates to containers and more particularly to containers for floppy disks and other computer media.

As personal computers have become more and more commonplace, containers for storing floppy disks (diskettes) and other data storage media used with these computers have become increasingly popular. Typically, floppy disk containers are made of plastic, so as to be lightweight and inexpensive. The containers often provide a "full view" transparent cover, so that computer users can readily locate and identify the disks stored in a container without having to open the container.

Typically, "full view" covers for a floppy disk container are made of transparent plastic such as crystal polystyrene. Unfortunately, such plastic tends to be brittle and fragile. This means that during packing and shipment of the containers, the covers must be specially protected, using outer packing material such as cardboard. This increases the bulk and cost of the shipment.

Some known floppy disk containers can be packed with the base nested in the cover. This tends to reduce the volume occupied by such containers during shipping. However, the reduction in volume is offset by the need to wrap the fragile cover in a protective plastic film to protect against scratches and a strong outer packing box to protect against cracking during impact.

Containers of known design thus do not minimize the amount of extraneous packing material that must be shipped with each container. This increases the production and shipping costs of such containers. It also leads to waste in the form of discarded packing materials that must somehow be disposed of by the consumer.

SUMMARY OF THE INVENTION

The invention is a stackable container for computer media, such as floppy disks or the like. Its design allows more containers to be packed into a given shipment volume and with less extraneous packing material required than for previous designs. In this way, production and shipping costs for containers can be minimized, and environmentally unsound waste is eliminated.

According to the invention, the container comprises a base and a removable cover. During ordinary use of the container, the cover fits in an upright orientation securely atop the base to provide closure of the container. The cover is constructed so that when it is removed and inverted, it nests in the base of the container. Thus, during packing and shipment (or storage) of the container, the cover is removed and inverted and nested in the base. The cover, which is typically made of clear styrene, is relatively brittle, and the ability to nest the cover in the base, which is typically made of a more resilient plastic, provides protection from physical damage to the cover during shipment. Also, the base is constructed to at least partially nest in the inverted cover, so that multiple containers can be packed and shipped more compactly.

In another aspect the invention provides a method for stacking multiple floppy disk containers. With the cover of one container nested in the base, the base is partially nested in the inverted cover of the next container.

The invention will be better understood by reference to the following detailed description in connection with the accompanying drawings.

BRIEF DESCRIPTION OF THE DRAWINGS

DESCRIPTION OF SPECIFIC EMBODIMENTS (Corresponding elements of different Figures are labeled with corresponding numbers.)

The invention is a container for floppy disks or the like. In a typical embodiment, the container is built to accommodate forty (40) 3.5" diskettes or 5 data cartridges, or any computer media that can be conveniently filed in the same manner. The container comprises a base, which is typically molded in resilient polypropylene, and a cover, typically a see-through "full view" cover molded in the more brittle crystal styrene.

The finished product is designed to ship KD (knockdown). The cover is placed upside-down in the base to save space during shipping and while the product is on the retail shelf. The inventive container is shipped with the cover inside the base. This approach lets the base act as a cushion/shock absorption structure to protect the more fragile cover. The base also prevents the cover from being scratched. The overall product thus requires much less protective outer packing material than other products with a "full view" cover.

The cover is typically one half the height of the base. It is only about half height because there are molded partitions in the base which the cover's top must clear while in the KD position. The cover is supported inside the base at either end. At the rear it is preferably snapped into place at the hinge points. The front only sits on a lip in the base. Since the cover is retained at only one end, the base is allowed to absorb impact by deforming in a side-to-side and front-to-back fashion before transferring the force to the more fragile cover.

Another level of nesting is available in this product. When molded, bases fit into bases, which allows bases to be made in advance and stored in relatively little space. When units are shipped complete (covers in bases) in KD fashion, completed units nest within themselves. That is, bottom of the base fits in the cover of the unit below. This allows for additional space savings during bulk shipments or when multiple units are sold together as one pack. For instance, two units according to a typical embodiment of the present invention can fit in the same volume as a single prior art unit.

Figure 1:
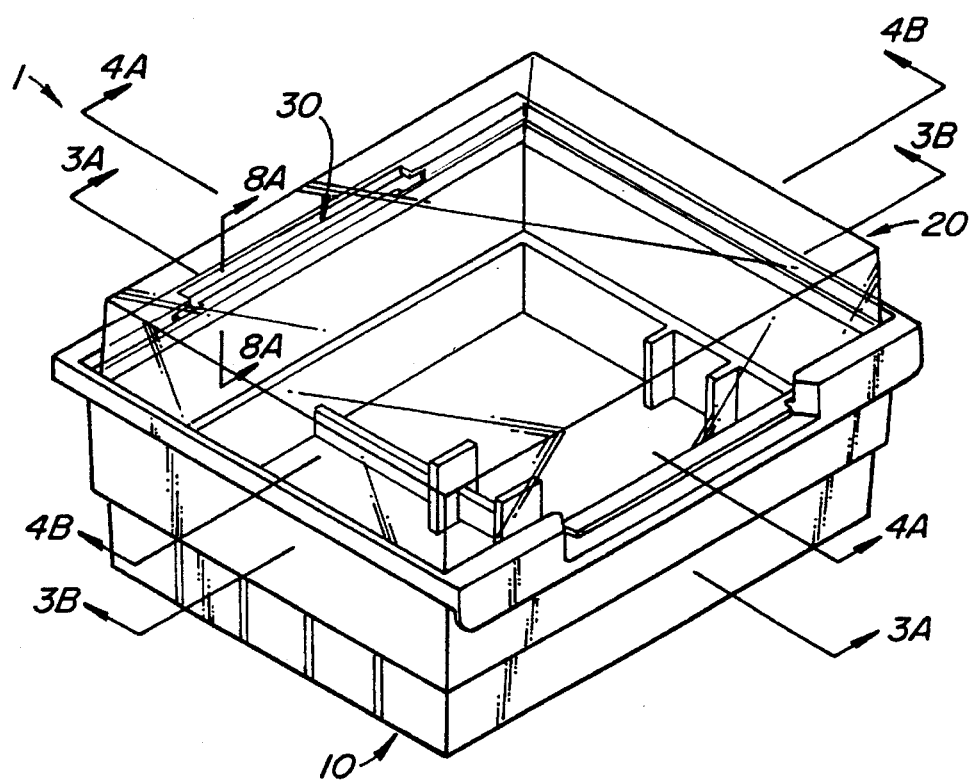
FIG. 1 is a perspective view of a specific embodiment of a container according to the invention, as configured for ordinary use, with the cover closed.

FIG. 1 illustrates a perspective view of a container according to the invention as configured for ordinary use to hold floppy disks or the like. Container 1 comprises a base 10 and a removable cover 20. Base 10 is preferably formed of flexible plastic material such as polypropylene. Cover 20 is preferably formed of transparent material such as crystal polystyrene to provide the user with a "full view" of the contents of the container 1 even when cover 20 is closed as shown. Both base 10 and cover 20 are typically constructed as single pieces of plastic. In this embodiment, base 10 and cover 20 are connected by a hinge 30.

In ordinary use of container 1, cover 20 is rotatably engaged with base 10 by means of hinge 30, whose components in this embodiment are integral parts of base 10 and cover 20. For purposes of packing and shipment of container 1, cover 20 can be disengaged and completely removed from base 10, and then can be placed in an inverted orientation and nested within base 10, with certain components of hinge 30 serving to engage cover 20 securely within base 10 in this "knockdown" (KD) configuration.

Figure 2:
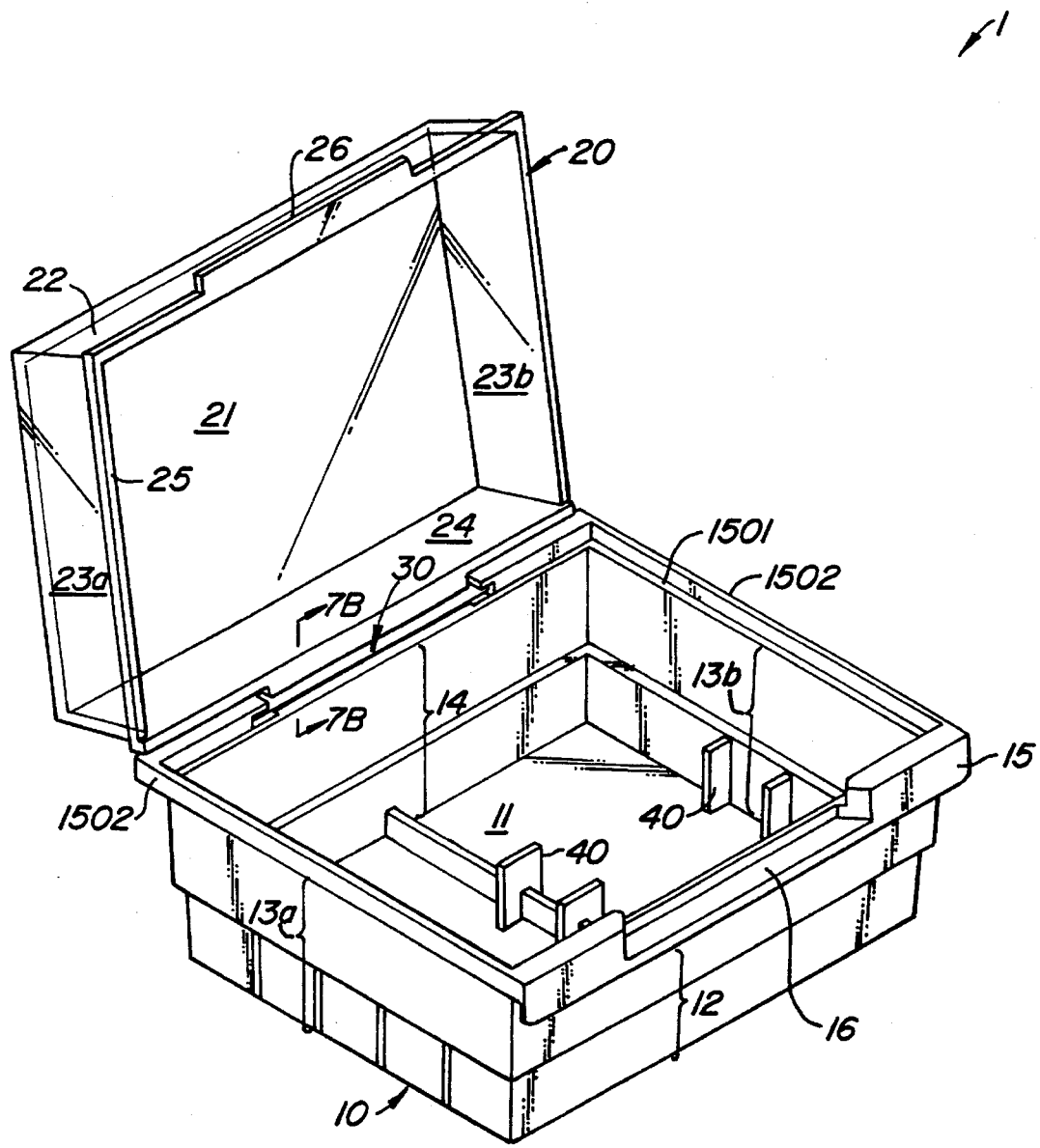
FIG. 2 is a perspective view of the same specific embodiment of the invention shown in FIG. 1, as configured for ordinary use, with the cover fully open and backstopped.

FIG. 2 illustrates a view of container 1 with the cover 20 in a fully open and backstopped position. As will be described with reference to FIG. 8B below, hinge 30 provides a backstop wall 35 (not visible in FIG. 2) so that cover 20 can rest supported in a position approximately perpendicular or slightly oblique to base 10 when cover 20 is fully open.

Base 10 comprises a floor 11, a front base wall 12, two side base walls 13a, 13b, a rear base wall 14, and a base lip 15 that surmounts the four base walls 12, 13a, 13b, 14. Floor 11 is typically planar and rectangular.

Base lip 15 is an upper lip of base 10. In the vicinity of front base wall 12, base lip 15 has a central cutout 16 adapted to accommodate a handle 26 of cover 20 when container 1 is closed. In the vicinity of rear base wall 15, base lip 15 incorporates components of hinge 30. Base lip 15 comprises a lateral portion 1501 and a projecting portion 1502. Lateral portion 1501 forms a ledge at the top of the base walls 12, 13a, 13b, 14. Projecting portion 1502 projects upward from lateral portion 1501.

Cover 20 comprises a top surface 21, a front cover wall 22, two side cover walls 23a, 23b, a rear cover wall 24, and a cover lip 25. Top surface 21 is typically rectangular and planar. The four cover walls—that is front wall 22, side walls 23a, 23b, and rear wall 24—are typically planar and trapezoidal, and flare outward slightly from the perpendicular with respect to the plane defined by top surface 21.

Cover lip 25 is a lower lip of cover 20 that runs beneath the four cover walls 22, 23a, 23b, 24. In the vicinity of the center of front cover wall 22, a widened central portion of cover lip 25 preferably projects frontwardly away from cover 20 to form (or, in some embodiments, to provide attachment for) handle 26. In the vicinity of rear cover wall 24, cover lip 25 incorporates components of hinge 30. Cover lip 25 is substantially planar and extends laterally outward from the cover walls 22, 23, 24 to which it is attached. Like its counterpart, base lip 15, cover lip 25 runs substantially all the way around the portion of container 1 to which it is attached (that is, all the way around cover 20). Cover lip 25 is sized to fit snugly within base lip 15, and more particularly, to rest on lateral portion 1501 of base lip 15 when cover 20 is closed as was shown in FIG. 1.

Also visible in FIG. 2 are separator partitions 40 that are connected to floor 11. These partitions are used to provide convenient separation between floppy disks or other computer storage media that are stored in container 1. In some embodiments, separator partitions 40 are removable and can be placed at different locations on floor 11 according to the user's convenience. In other embodiments, separator partitions 40 are fixed and are an integral part of base 10. In still other embodiments, separator partitions 40 are absent.

Figure 3A:
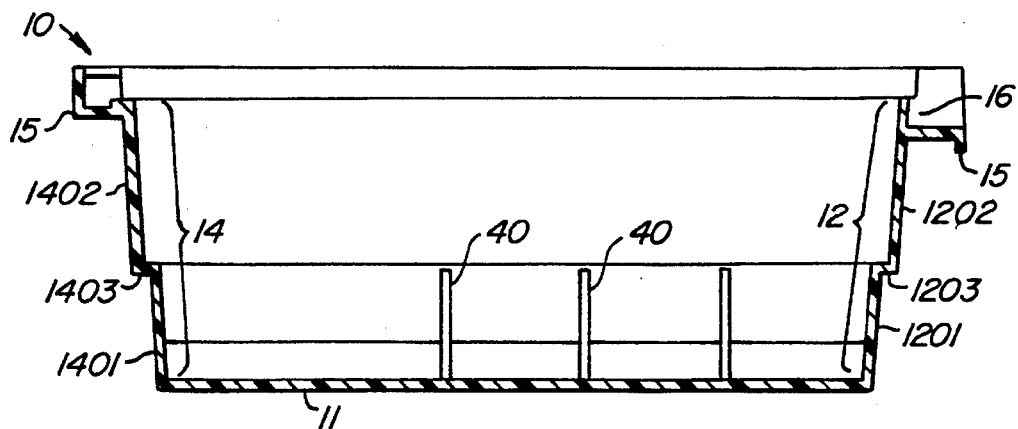
FIG. 3A is a cross-sectional view of the base of the container according to the same specific embodiment of the invention shown in FIG. 1, the cross section being taken from the front to the rear of the container.
Figure 3B:
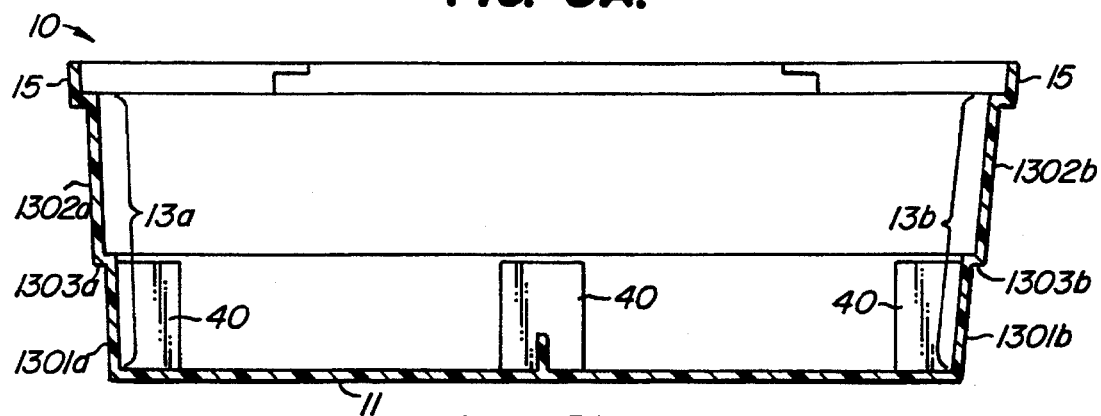
FIG. 3B is a cross-sectional view of the base of the container according to the same specific embodiment of the invention shown in FIG. 1, the cross section being taken from one side of the container to the other.

The structure of the walls of base 10 can further be seen in the cross-sectional views of FIGS. 3A–3B. FIG. 3A is a front-to-rear cross-sectional view of base 10, showing front base wall 12 and rear base wall 14, along with floor 11, central cutout 16, and portions of base lip 15. Front base wall 12 further comprises a lower panel 1201 connected to an upper panel 1202 by a ledge 1203. Similarly, rear base wall 14 comprises a lower panel 1401 connected to an upper panel 1402 by a ledge 1403. FIG. 3B is a side-to-side cross-sectional view of base 10, showing side base walls 13a and 13b along with floor 11 and portions of lip 15. Side base walls 13a, 13b each comprise a lower panel (1301a, 1301b respectively) connected to an upper panel (1302a, 1302b respectively) by a ledge (1303a, 1303b respectively). The two side base walls 13a, 13b are substantially mirror images of one another.

The lower base wall panels-that is lower panel 1201 of front base wall 12, lower panels 1301a, 1301b of side base walls 13a, 13b, and lower panel 1401 of lower rear base wall 14—are typically planar and trapezoidal and are angled slightly outward from the perpendicular with respect to the plane defined by floor 11. The upper base wall panels—that is, upper panel 1202 of front base wall 12, upper panels 1302a, 1302b of side base walls 13a, 13b, and upper panel 1402 of rear base wall 14—are typically trapezoidal and planar as well, and are slightly larger in linear and areal dimensions than the corresponding lower base wall panels. The ledges of each of the base walls—that is, ledge 1203 of front base wall 12, ledges 1303a, 1303b of side base walls 13a, 13b, and ledge 1403 of rear base wall 14—are typically narrow, on the order of the thickness or twice the thickness of base 10. In some embodiments the ledges (more specifically, their lower surfaces) can serve to support the base of one container nested at least partially within the inverted cover of another container for purposes of stacking several containers.

The segmented or "stairstepped" structure of the base walls 12, 13a, 13b, 14 gives rise to two distinct regions or volumes contained within base 10. The lower panels of the four base walls (that is, lower panels 1201, 1301a, 1301b, and 1401) bound a lower region or volume of base 10, and the upper panels of the four base walls (that is, upper panels 1202, 1302a, 1302b, and 1402) bound an upper region or volume of base 10. Because of the trapezoidal shapes of these lower and upper panels and the presence of the ledges 1203, 1303a, 1303b, 1403, the cross-sectional area of base 10 increases continuously as one moves from floor 11 up to the top of the lower region or volume, undergoes a stepwise increase at the "stairstep" point of the ledges, further increases continuously from the bottom of the upper region or volume to the top of that volume, and undergoes yet another stepwise increase in cross-sectional area at the juncture of base lip 15 with the upper panels 1202, 1302a, 1302b, 1402.

Figure 4A:
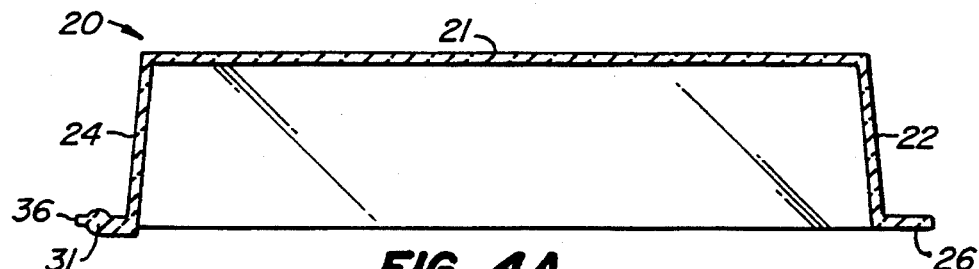
FIG. 4A is a cross-sectional view of the cover of the container according to the same specific embodiment of the invention shown in FIG. 1, the cross section being taken from the front to the rear of the container.
Figure 4B:
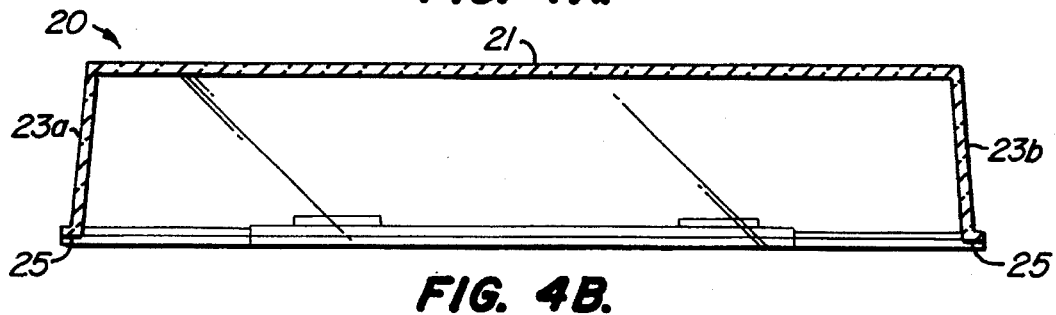
FIG. 4B is a cross-sectional view of the cover of the container according to the same specific embodiment of the invention shown in FIG. 1, the cross section being taken from one side of the container to the other.

The structure of the walls of cover 20 can further be seen in the cross-sectional views of FIGS. 4A–4B. FIG. 4A is a front-to-rear cross-sectional view of cover 20, showing front cover wall 22 and rear cover wall 24, along with top surface 21, handle 26, and a portion of hinge pin 31 with counterstop 36. FIG. 4B is a side-to-side cross-sectional view of cover 20, showing side cover walls 23a and 23b, along with top surface 21 and portions of cover lip 25. The cover walls 22, 23a, 23b, and 24 lack the segmented or "stairstepped" structure of the base walls 12, 13a, 13b, 14 in this embodiment.

Figure 5:
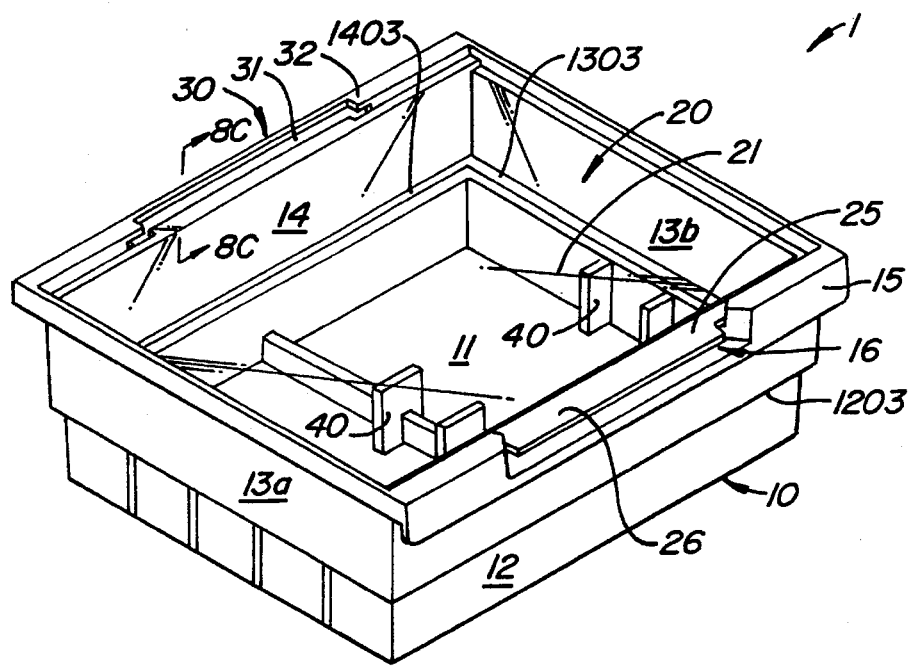
FIG. 5 is a perspective view of the same specific embodiment of the invention shown in FIG. 1, as configured "knockdown" (KD) for packing and shipment.

FIG. 5 shows container 1 configured KD with cover 20 nested securely within base 10 in an inverted orientation, as is done when container 1 is packed for storage or shipment. In this KD configuration base 10 protects cover 20 from breakage or other physical damage. As already mentioned, base 10 is preferably formed of a flexible material. This means that base 10 is suitable to withstand shocks that might otherwise cause damage to cover 20 and to protect cover 20 from such shocks when cover 20 is nested within base 10.

In the KD configuration of container 1, cover lip 25 nests within base lip 15 and base lip 15 supports cover lip 25, thereby supporting cover 20. More particularly, primary support for cover 20 can be provided, for example, by base lip 15 in the vicinity of central cutout 16, where base lip 15 supports handle 26, and by base lip 15 in the vicinity of hinge housing 32, where base lip 15 supports components of hinge 30 associated with cover 20. The "stairstepped" shape of base 10, which gives rise to distinct lower and upper regions or volumes within base 10, in effect provides a receptacle (namely, the upper region or volume) for nesting cover 20 within base 10 in this embodiment. Also, separator partitions 40 are sufficiently short to provide clearance for top surface 21 when cover 20 is nested within base 10 in the inverted configuration. Thus separator partitions 40 do not prevent or impede cover 20 from fully nesting within base 10.

Although FIG. 5 shows cover 20 nested within base 10 so that the rear of cover 20 is closest to the rear of base 10, in some embodiments, cover 20 can be turned around so that it nests within base 10 with the rear of cover 20 closest to the front of base 10 and vice versa. That is, in some embodiments, handle 26, hinge pin 31, central cutout 16, and hinge housing 32 are sized so that handle 26 can fit within hinge housing 32 and hinge pin 31 can fit within central cutout 16. Thus cover 20 can be turned around front-to-rear before being nested within base 10, so that upon such nesting, rear cover wall 24 is closest to front base wall 12 and front cover wall 22 is closest to rear base wall 14.

In a preferred embodiment of the invention it is possible not only to nest the cover of one container within the base of that container, but also to nest the base of a second container at least partially within the cover of the first container, so that multiple containers can be stacked easily and securely. This is illustrated in FIGS. 6A and 6B, which show how multiple containers can be stacked according to the present invention.

Figure 6B:
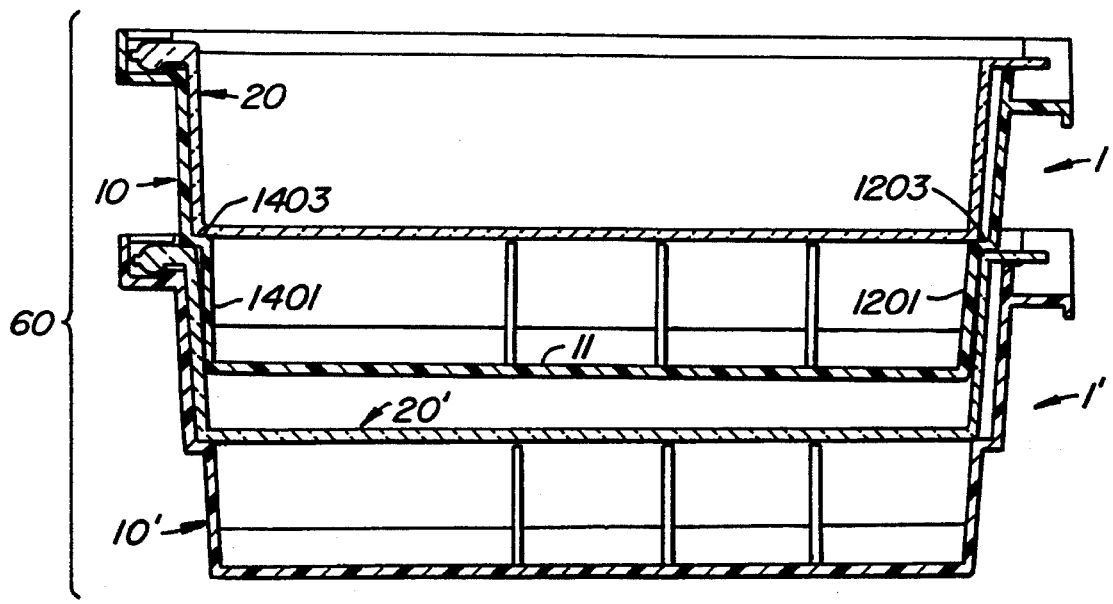
FIG. 6B is a cross-sectional view showing how containers can be stacked according to the invention.
Figure 6A:
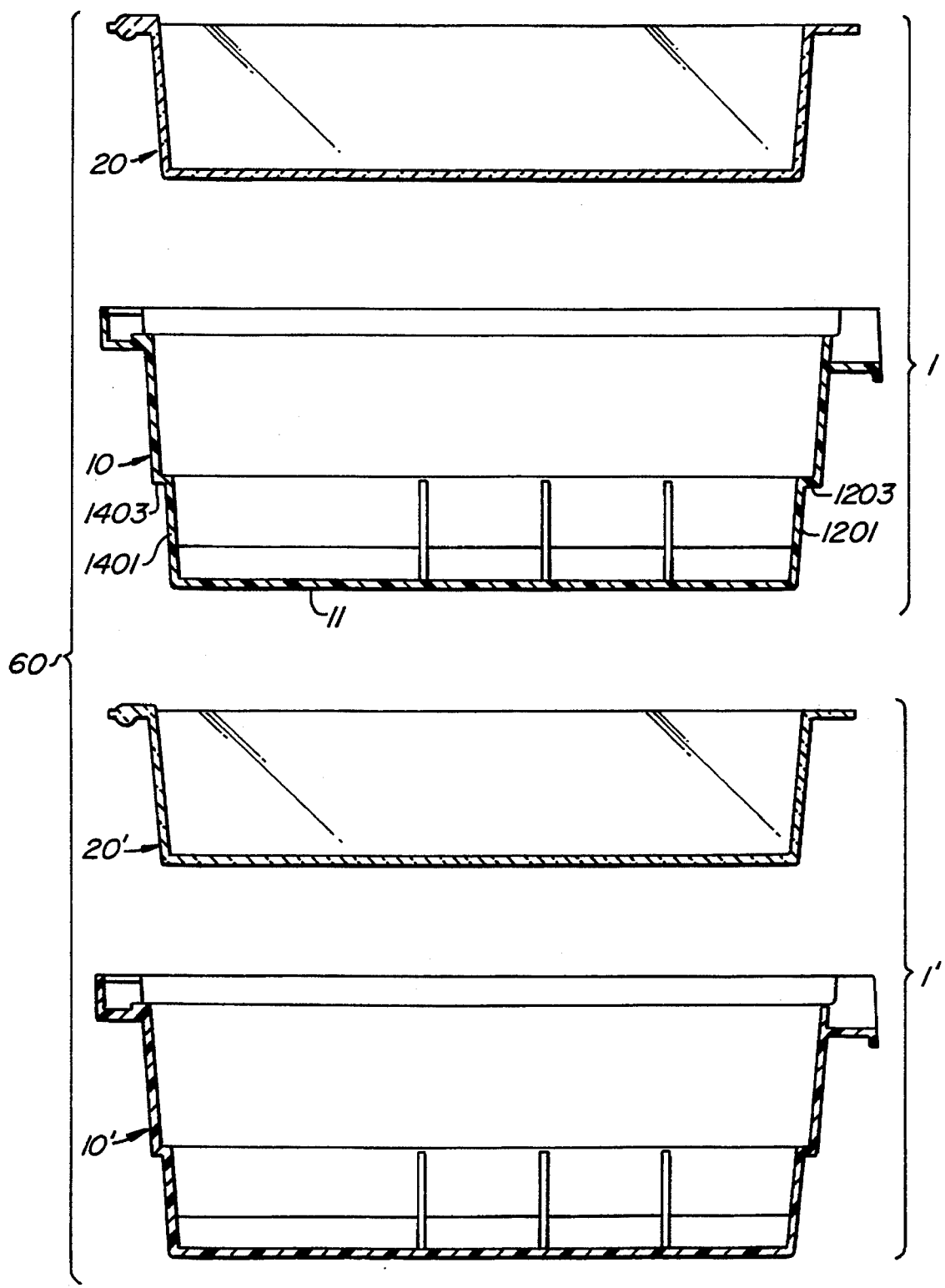
FIG. 6A is an exploded cross-sectional view showing how containers can be stacked according to the invention.

FIG. 6A is an exploded cross-sectional view of a stack 60 of containers 1 and 1' according to the present invention. First container 1 comprises first base 10 and first cover 20, as in FIG. 1. Second container 1' comprises second base 10' and second cover 20'. Both containers are in KD configuration; in particular, first cover 20 and second cover 20' are in their inverted orientations, ready to be nested within first and second bases 10 and 10' respectively The lower portions of first base 10—specifically, its floor 11, lower front wall panel 1201 and lower rear wall panel 1401, and lower side wall panels (not shown)—can nest within the inverted second cover 20'.

FIG. 6B is a (nonexploded) cross-sectional view of the two containers 1, 1' nested in a stack 60 as in FIG. 6A. The ledges of first base 10—that is, first front base wall ledge 1203, first rear base wall ledge 1403, and first side base wall ledges (not shown)—both provide support for first cover 20 nested in an inverted orientation within first base 10, and provide a place of support whereby second cover 20' can support first base 10 nested partially within second cover 20'. In other words, the "stairstepped" ledge construction of the first base 10 lets first cover 20 be supported within first base 10 and lets first base 10 be nested partially within and supported by second cover 20'.

Figure 7:
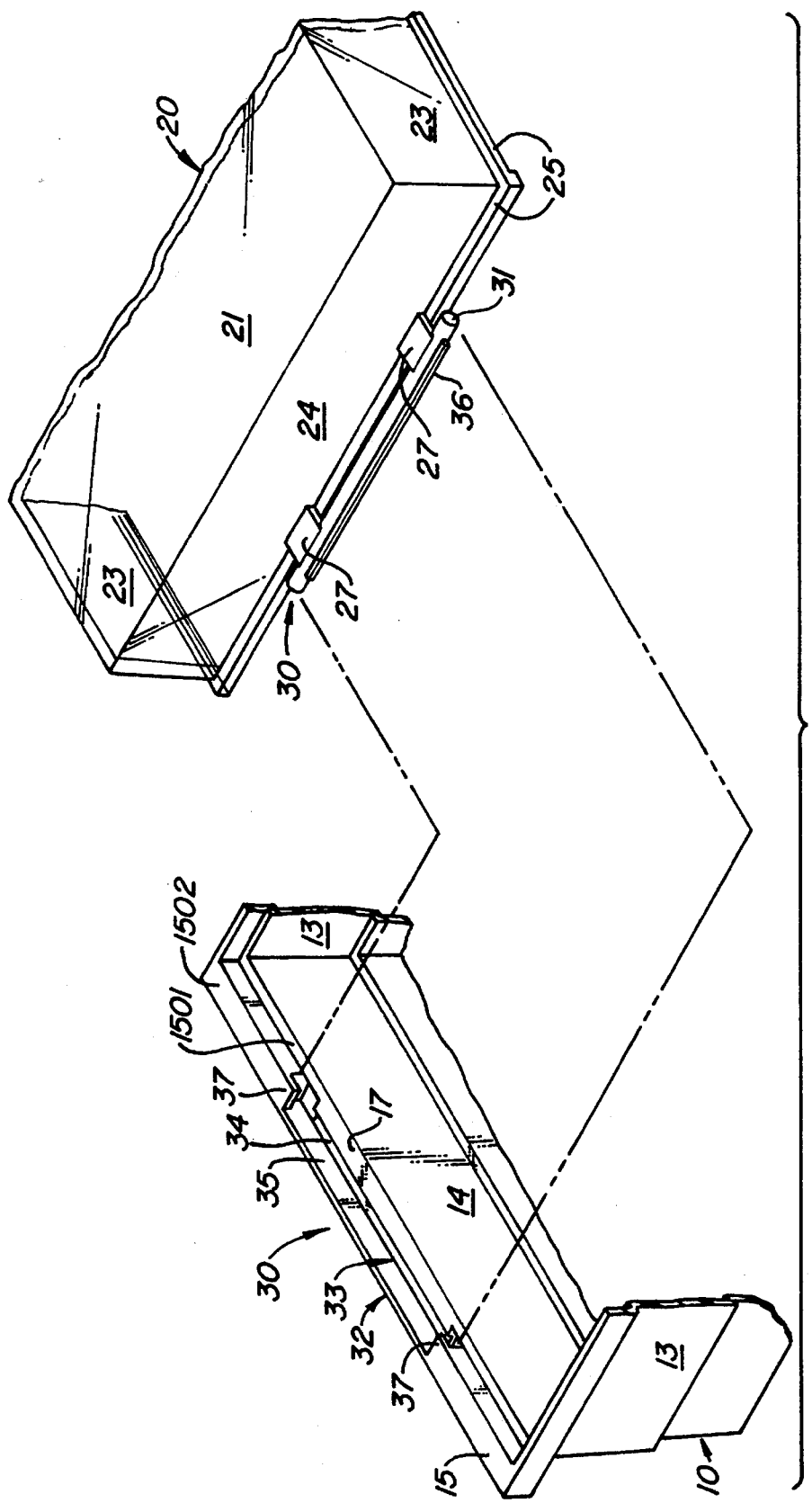
FIG. 7 is an exploded view of the container hinge, showing the structure of the hinge and how the cover can be removed.

As was mentioned earlier, in the embodiment of FIG. 1, base 10 and cover 20 are connected by a hinge 30. FIG. 7 is an exploded view of hinge 30. Hinge 30 comprises hinge pin 31 and hinge housing 32. In this embodiment, hinge pin 31 is a protuberant member projecting from cover 20. Hinge pin 31 attaches to cover 20 at a rearward, preferably widened portion of cover lip 25. Spacers 27 straddle cover lip 25 in the vicinity of hinge pin 31 and protrude upwardly from cover lip 25. Spacers 27 are preferably formed of widened and thickened portions of cover lip 25. Hinge housing 32, which is incorporated into base 10 as part of base lip 15 atop rear wall 14, includes a recessed opening 33 that is adapted to receive hinge pin 31.

According to a preferred embodiment of the invention, hinge pin 31 can be fitted into recessed opening 33 in two different configurations of container 1. When container 1 is configured for ordinary use as a storage container for computer media, hinge pin 31 is rotatably disposed within recessed opening 33 of hinge housing 32. Thus cover 20 can freely be rotated from the closed configuration of FIG. 1 through an arc of substantially 90 degrees or more all the way up to the backstopped configuration of FIG. 2. When container 1 is configured KD for packing or shipment, with cover 20 in an inverted orientation and nested within base 10, hinge pin 31 fits securely within recessed opening 33 of hinge housing 32 (it need not be rotatable therewithin). As a consequence, all of cover 20, including hinge pin 31, can be nested within base 10 in this configuration; the design of hinge 30 is such that when container 1 is configured KD, cover 20 nests flush within base 10 without interference from hinge 30. Moreover, hinge pin 31 serves to engage cover 20 with base 10 in this configuration, which helps to prevent cover 20 from sliding out of base 10 during shipment.

To switch between the two configurations of container 1, cover 20 is removed from base 10. In either configuration, cover 20 can be removed from base 10 by sliding hinge pin 31 forward (that is, towards the front of base 10) so that it slips out of hinge housing 32. This disengages cover 20 from base 10 so that it can be removed completely.

Typically, hinge pin 31 is substantially cylindrical and is mounted centrally alongside a lower edge of rear cover wall 24. Hinge pin 31 attaches to a widened portion of cover lip 25 that projects rearwardly from cover 20 in the vicinity of rear cover wall 24. Hinge pin 31 can be formed as a cylindrical protuberance contiguous with cover lip 25. Preferably, hinge pin 31 has a small planar nub running longitudinally opposite from cover lip 25; this nub forms a projecting counterstop 36.

In the vicinity of rear base wall 14, projecting portion 1502 of base lip 15 includes hinge housing 32 for receiving hinge pin 31. In this embodiment, hinge housing 32 comprises: a lateral projection 34 that forms the lower surface of hinge housing 32; a backstop wall 35; and overhanging catch surfaces 37 that retain hinge pin 31 in position when hinge pin 31 is disposed in recessed opening 33. A widened portion of lateral portion 1501 of base lip 15 projects rearwardly away from base 10 to form hinge housing standoff 17, from which hinge housing 32 projects.

Practitioners of the art will appreciate that other alternative hinge designs can be used within the scope of the invention. For example, hinge pin 31 can be replaced by two smaller hinge pins or by stub ends in some embodiments. As another example, although in the embodiment of FIGS. 1–2 hinge 30 comprises cooperating elements of base 10 and cover 20, in some embodiments hinge 30 can be integrated primarily with base 10 or, alternatively, primarily with cover 20. In other embodiments hinge 30 can be separate and distinct from base 10 and cover 20. In still other embodiments hinge 30 can be omitted entirely.

Figure 8A:
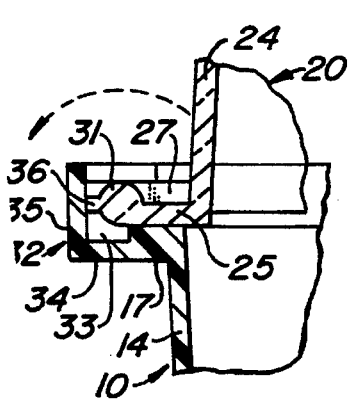
FIG. 8A is a cross-sectional view of the container hinge with the container cover closed.
Figure 8B:
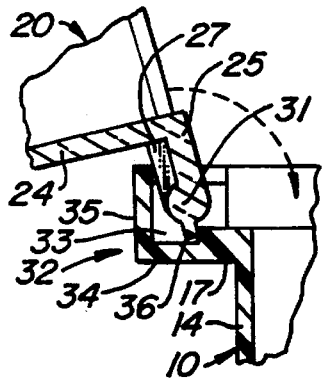
FIG. 8B is a cross-sectional view of the container hinge with the container cover open and backstopped.
Figure 8C:
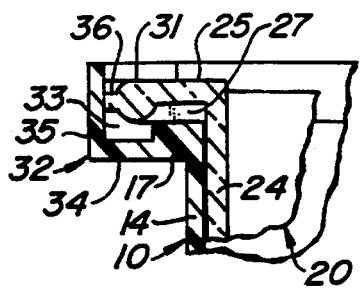
FIG. 8C is a cross-sectional view of the container hinge with the container configured "knockdown" (KD) for packing and shipment.

FIGS. 8A–8C depict in cross section the mechanism of hinge 30 taken along lines 8A—8A in FIG. 1, 8B—8B in FIG. 2, and 8C—8C in FIG. 5, respectively. FIG. 8A is a cross-sectional view of hinge 30 when container 1 is configured for ordinary use, with cover 20 in a closed position and upright orientation atop base 10 as was shown in FIG. 1. Hinge pin 31 is rotatably disposed within hinge housing 32 so that cover 20 can freely rotate and swing backwards about an axis parallel to the rear top edge of base 10. Container 1 can be opened by rotating cover 20 in the direction indicated by the dashed arrow.

FIG. 8B is a cross-sectional view of hinge 30 when cover 20 is in the backstopped, fully open position as was shown in FIG. 2. In both FIGS. 8A and 8B, cover lip 25 in the vicinity of rear cover wall 24 provides attachment between hinge pin 31 and the rest of cover 20, more specifically between hinge pin 31 and rear cover wall 24. In FIG. 8A, cover lip 25 can be seen resting on hinge housing standoff 17. In FIG. 8B, spacer 27 can be seen resting against the backstop wall 35 of hinge housing 32, so that cover 20 is prevented from opening any further. Also, hinge pin 31 has a projecting counterstop 36, which rests against hinge housing standoff 17. Cover 20 can be closed by rotating in the direction of the dashed arrow of FIG. 8B.

FIG. 8C is a cross-sectional view of hinge 30 when container 1 is configured KD for packing and shipment, with cover 20 in its inverted orientation and nested within base 10 as was shown in FIG. 5. Hinge pin 31 fits within hinge housing 32 even though cover 20 is inverted and nested within base 10. The spacing between hinge pin 31 and rear wall 24 of cover 30 is such that cover lip 25 in the vicinity of spacers 27 fits over hinge housing standoff 17. Spacers 27 rest on hinge housing standoff 17. (FIG. 8C, being a sectional view, shows only one the spacers 27; both spacers 27 are shown in FIG. 7.) Spacers 27 help to maintain hinge pin 31 securely within hinge housing 32 in this configuration of container 1, and in particular help to minimize up-and-down rattling of hinge pin 31 within hinge housing 32, thus preventing unnecessary shocks to cover 20 during shipment of container 1.

In sum, as shown in FIGS. 8A and 8B, when container 1 is configured for ordinary use with cover 20 in its substantially upright orientation, hinge pin 31 is rotatably disposed in hinge housing 32, and hinge 30 is thereby configured to rotate cover 20 about an axis of rotation parallel to the upper rear wall edge of base 10. Thus the user of container 1 can easily open and close cover 20 to access or secure the computer storage media stored within container 1. When, as shown in FIG. 8C, container 1 is configured KD for packing and shipment with cover 20 in its inverted orientation and nested within base 10, hinge pin 31 "reverses" so that it fits in hinge housing 32 notwithstanding the inverted orientation of cover 20. In this way, the nesting of cover 20 within base 10 is complete and secure and is not obstructed by the mechanism of hinge 30 (in particular, by hinge pin 31). Hinge pin 31 fits flush within hinge housing 32, so that cover 20 as a whole can lie flush within base 10.

Figure 9A:
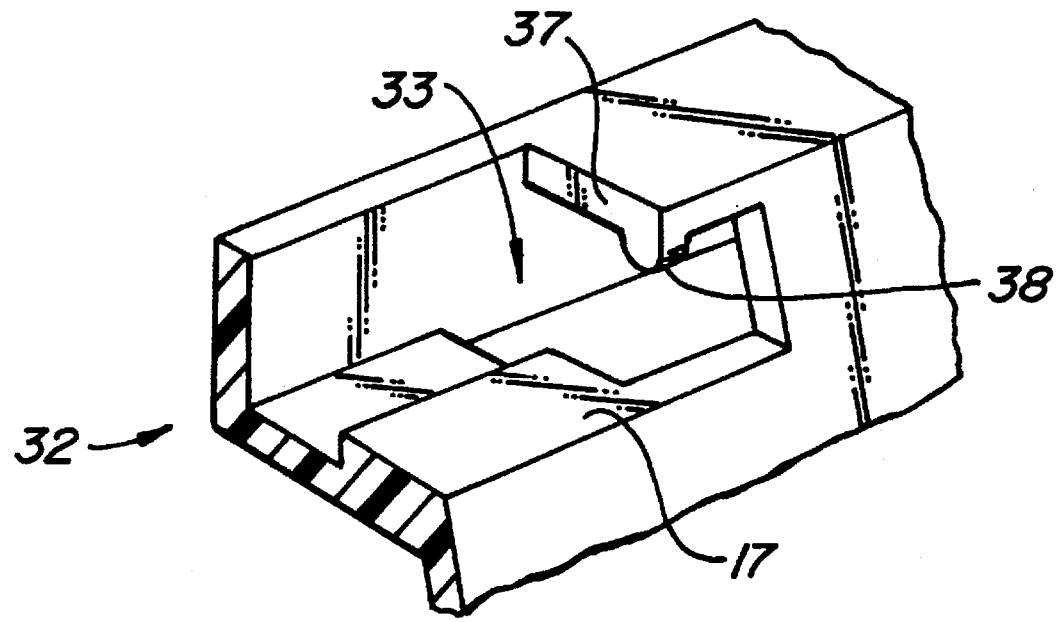
FIG. 9A is a perspective view of a portion of the hinge housing in an embodiment that provides "lock-in" retention of the hinge pin.
Figure 9B:
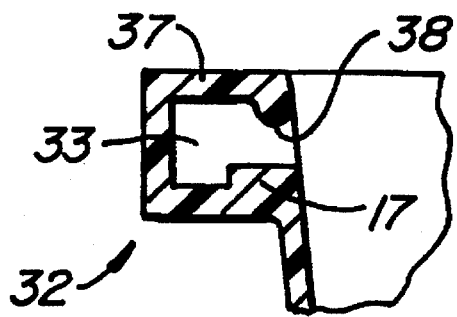
FIG. 9B is a cross-sectional view of a portion of the hinge housing in an embodiment that provides "lock-in" retention of the hinge pin.

In some embodiments, the hinge pin can be more securely retained in the hinge housing by means of "lock-in" protrusions located on the overhanging catch surfaces of the hinge housing. This is illustrated in FIGS. 9A–9B. FIG. 9A is a close-up view of a portion of a hinge housing 32 near one of the overhanging catch surfaces 37. Protrusion 38 projects downward slightly from catch surface 37. The spacing between the tip of protrusion 38 and lateral surface 17 is slightly less than the diameter of the hinge pin used in this embodiment. When a hinge pin is to be inserted in the hinge housing 32, it pushes against protrusion 38 and thereby deflects catch surface 37 upwardly, allowing the hinge pin to move past protrusion 38 and into recessed opening 33. The flexible material used to construct the base, including hinge housing 32 and in particular catch surface 37, moves back into place once the hinge pin is fully within the recessed opening 33, thus "locking" the hinge pin into hinge housing 32. This "lock-in" works regardless of whether the cover on which the hinge pin is mounted is in an upright orientation or is inverted for nesting within the base. To remove the cover, the hinge pin is slid out past protrusion 38, once again causing a temporary deflection of catch surface 37 as the hinge pin slides past protrusion 38.

FIG. 9B is a cross-sectional view of the hinge housing in the embodiment of FIG. 9A. The cross section is taken at the point at which protrusion 38 attaches to catch surface 37.

In the embodiments of the invention described so far, the cover of the container is approximately half the height of the base of the container. This can be seen, for example, in the sectional view of FIG. 6A, in which first cover 20 is approximately half the height of first base 10, and second cover 20' is approximately half the height of second base 10'. However, in other embodiments of the invention, the cover need not be one-half the height of the base (that is, the height ratio between the base and cover can be other than 2:1). This is seen, for example, in the embodiment of FIG. 10, in which the cover 120 of container 101 is nearly the same height as the base 110.

Figure 10:
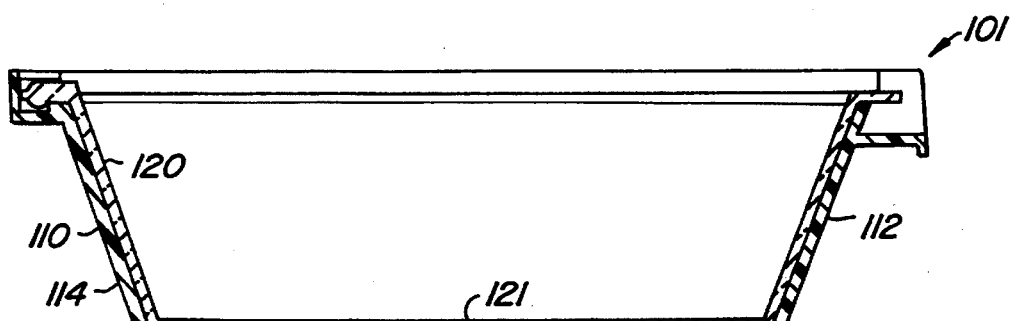
FIG. 10 is a cross-sectional view of an embodiment of the invention that affords more dense stacking than is possible with certain other embodiments.

FIG. 10 shows container 101 in KD configuration, with cover 120 in its inverted orientation and nested within base 110. Unlike the "stairstepped" base walls comprising upper and lower regions of the embodiments previously described, container 101 has single-region base walls such as front base wall 112 and rear base wall 114. Also, base 110 has no separator partitions on its floor 111, in contrast with the separator partitions 40 that were present on floor 11 of base 10 in FIG. 1 and elsewhere. Accordingly, when container 101 is in KD configuration with cover 120 is in its inverted orientation and nested within base 110, the top 121 of cover 120 touches or nearly touches the floor 111 of base 110. As a consequence, multiple units of the form of container 101 can be stacked in the manner described earlier with reference to FIGS. 6A and 6B, but with even more compact disposition of the containers. That is, with this embodiment, more containers can be stacked within a given volume than is possible with the embodiment shown in FIGS. 6A and 6B. This makes for denser, more efficient packing of such containers and thus results in greater space savings during shipping of the containers.

In conclusion, the present invention provides a "full view" container for computer media that can be shipped in a configuration that protects its fragile cover within its flexible base. The container's cover is removable and nestable within the base. Multiple containers can be stacked. The container can be hinged, and the hinge can be designed to facilitate the nesting of the cover within the base. In some embodiments, separator partitions are provided to separate the computer media stored in the container. In other embodiments, these partitions are omitted to facilitate more dense stacking of containers.

The invention has been explained with reference to specific embodiments. Other embodiments are contemplated without departing from the spirit and scope of the invention. For example, containers can be made according to the invention in different sizes to accommodate a wide range of computer media, including but not limited to 5¼" diskettes, CD-ROM disks, and VHS videotapes. As another example, the hinge need not be placed at the rear of the container. As yet another example, in embodiments in which the base walls are "stairstepped," the base wall panels can be rectangular rather than trapezoidal. It is therefore not intended that this invention be limited, except as indicated by the appended claims.

What is claimed is:

1. A stackable container for computer media, comprising:

a base; and a removable cover that in a first orientation can be fitted securely atop said base to provide closure of said container and that in a second orientation:
 a) can be nested above and completely within said base to provide compact disposition of said container and to protect said cover from physical damage; and
 b) can be disposed below said base with at least a portion of said base nested within said cover;
wherein said base is fabricated of a relatively resilient material and said cover is fabricated of a relatively brittle material relative to said base, so that when said cover is removably nested within said base, said base deforms to absorb a horizontal impact prior to transferring a force to said nested cover.

2. The container of claim 1 wherein:
 a) said base includes:
  i) a substantially planar floor;
  ii) a plurality of base walls, each base wall comprising:
   a substantially planar lower panel connected to said floor;
   a substantially planar upper panel; and
   a ledge substantially parallel to said floor providing a connection between said lower panel and said upper panel;
  iii) a base lip attached to and surmounting the upper panels of said base walls, said base lip including a housing means for receiving a hinge pin means; and
 b) said cover includes:
  i) a substantially planar top surface;
  ii) a plurality of substantially planar cover walls, each cover wall connected to said top surface;
  iii) a cover lip connected to said cover walls opposite to said top surface; and
  iv) a hinge pin means disposed along said cover lip, said hinge pin means being adapted to fit rotatably within said housing means when said cover is in said first orientation and fitted securely atop said base, and to fit within said housing means when said cover is in said second orientation and nested within said base.

3. The container of claim 1 wherein:
said resilient material comprises polypropylene; and
said brittle material comprises polystyrene.

4. The container of claim 1 wherein said cover is fabricated at least in part of transparent material.

5. The container of claim 1 further comprising a hinge means to provide a rotatable disposition of said cover about an axis of rotation parallel to a top edge of said base.

6. A stackable container for computer media, comprising:
a base; and
a removable cover that in a first orientation can be fitted securely atop said base to provide closure of said container and that in a second orientation:
 a) can be nested above and completely within said base to provide compact disposition of said container and to protect said cover from physical damage; and
 b) can be disposed below said base with at least a portion of said base nested within said cover; and
a hinge to provide a rotatable disposition of said cover about an axis of rotation parallel to a top edge of said base;
wherein said base further comprises an engaging portion to engage at least a portion of said hinge when said cover is disposed within said base in said second orientation.

7. The container of claim 1 wherein said cover is formed with a hinge pin and said base has a portion configured to receive said hinge pin when said cover is in said first orientation.

8. A stackable container for computer media, comprising:
a base; and
a removable cover that in a first orientation can be fitted securely atop said base to provide closure of said container and that in a second orientation:
 a) can be nested above and completely within said base to provide compact disposition of said container and to protect said cover from physical damage; and b) can be disposed below said base with at least a portion of said base nested within said cover;

wherein said cover is formed with a hinge pin and said base has a portion configured to receive said hinge pin when said cover is removably nested within said base.

9. The container of claim 8 wherein said portion is configured to receive said hinge pin both when said cover is in said first orientation and when said cover is in said second orientation.

10. A stackable container for computer media, comprising:

a base; and a removable cover that in a first orientation can be fitted securely atop said base to provide closure of said container and that in a second orientation:
  a) can be nested above and completely within said base to provide compact disposition of said container and to protect said cover from physical damage; and
  b) can be disposed below said base with at least a portion of said base nested within said cover;

wherein said base is formed with a handle and a hinge pin, said handle being located at a first end of said cover, said hinge pin being located at a second end of said cover, said second end of said cover being opposite to said first end of said cover; and wherein said base is formed with a cutout and a hinge housing, said cutout being located at a first end of said base, said hinge housing being located at a second end of said base, said second end of said base being opposite to said first end of said base, said cutout being configured to receive said handle when said cover is in said first orientation, said hinge housing being configured to receive said hinge pin when said cover is in said first orientation.

11. The container of claim 10 wherein:

said cutout is configured to receive said handle when said cover is in said second orientation; and said hinge housing is configured to receive said hinge pin when said cover is in said second orientation.

12. The container of claim 10 wherein:

said cutout is configured to receive said hinge pin when said cover is in said second orientation; and said hinge housing is configured to receive said handle when said cover is in said second orientation.

13. The container of claim 1 further comprising a hinge means, said hinge means comprising:

a lip located along a top edge of said base, said lip including a housing means; and a protuberant member, fixed alongside a bottom edge of said removable cover, that can be rotatably disposed within said housing means when said removable cover is fitted atop said base in substantially said first orientation.

14. A stackable container for computer media, comprising:

a base;

a removable cover that in a first orientation can be fitted securely atop said base to provide closure of said container and that in a second orientation:
  a) can be nested above and completely within said base to provide compact disposition of said container and to protect said cover from physical damage; and
  b) can be disposed below said base with at least a portion of said base nested within said cover; and a hinge means, said hinge means comprising:

a lip located along a top edge of said base, said lip including a housing means; and a protuberant member, fixed alongside a bottom edge of said removable cover, that can be rotatably disposed within said housing means when said removable cover is fitted atop said base in substantially said first orientation;

wherein said protuberant member can be disposed entirely within said housing means when said removable cover is nested within said base in said second orientation.

15. The container of claim 13 wherein:

said base comprises a floor;

said removable cover comprises a top surface; and said removable cover can be fitted atop said base in substantially said first orientation with said top surface oriented substantially parallel to said floor.

16. A stackable container for computer media, comprising:

a base;

a removable cover that in a first orientation can be fitted securely atop said base to provide closure of said container and that in a second orientation:
  a) can be nested above and completely within said base to provide compact disposition of said container and to protect said cover from physical damage; and
  b) can be disposed below said base with at least a portion of said base nested within said cover; and a hinge means, said hinge means comprising:

a lip located along a top edge of said base, said lip including a housing means; and a protuberant member, fixed alongside a bottom edge of said removable cover, that can be rotatably disposed within said housing means when said removable cover is fitted atop said base in substantially said first orientation;

wherein said base comprises a floor;

wherein said removable cover comprises a top surface;

wherein said housing means comprises a backstop wall; and wherein said removable cover can be rested against said backstop wall with said protuberant member disposed rotatably within said housing means and said top surface oriented in an orientation selected from the group consisting of approximately perpendicular to said floor and at an oblique angle with respect to said floor.

17. A stackable container for computer media, comprising:

a base;

a removable cover that in a first orientation can be fitted securely atop said base to provide closure of said container and that in a second orientation:
  a) can be nested above and completely within said base to provide compact disposition of said container and to protect said cover from physical damage; and
  b) can be disposed below said base with at least a portion of said base nested within said cover; and a hinge means, said hinge means comprising:

a lip located along a top edge of said base, said lip including a housing means; and a protuberant member, fixed alongside a bottom edge of said removable cover, that can be rotatably disposed within said housing means when said removable cover is fitted atop said base in substantially said first orientation;

wherein said base comprises a floor;

wherein said removable cover comprises a top surface;

wherein said protuberant member further comprises a counterstop; and wherein said counterstop can be rested against a portion of said housing means with said protuberant member disposed rotatably within said housing means, said top surface oriented in an orientation selected from the group consisting of approximately perpendicular to said floor and at an oblique angle with respect to said floor.

18. A stackable container for computer media, comprising:

a base;

a removable cover that in a first orientation can be fitted securely atop said base to provide closure of said container and that in a second orientation;
  a) can be nested above and Completely within said base to provide compact disposition of said container and to protect said cover from physical damage; and
  b) can be disposed below said base with at least a portion of said base nested within said cover; and a hinge means, said hinge means comprising:
  a lip located along a top edge of said base, said lip including a housing means; and
  a protuberant member, fixed alongside a bottom edge of said removable cover, that can be rotatably disposed within said housing means when said removable cover is fitted atop said base in substantially said first orientation;

wherein said housing means comprises an overhanging catch surface for retention of said hinge pin within said housing means.

19. The container of claim 18 wherein:

said overhanging catch surface is flexibly deformable; and said housing means further comprises a protrusion to facilitate retention of said hinge pin within said housing means, said protrusion protruding from said catch surface.

20. The container of claim 1 wherein:

said base has a floor, and at least a portion of said base including substantially all of said floor can be stably disposed within said cover.

21. A stack comprising:

a plurality of stackable containers, wherein each container includes:

a base; and a removable cover that in a first orientation can be fitted securely atop said base to provide closure of said container and that in a second orientation:
  a) can be nested above and completely with said base to provide compact disposition of said container and to protect said cover from physical damage; and
  b) can be disposed below said base with at least a portion of said based nested within said cover;

wherein each cover is removably nested within the base; and wherein said base is fabricated of relatively resilient material and said cover is fabricated of relatively brittle material relative to said base, so that said base is capable of deforming to absorb a horizontal impact prior to transferring a force to said cover; and wherein a first cover of a first container of said plurality is removably disposed below a base of a second container of said plurality, and each base of said plurality other than a first base of said first container is removably disposed with at least a portion nested within a cover of another of said plurality; and wherein each cover is protected by at least one base which extends horizontally beyond the cover in all directions.

22. A computer media container comprising:

a) a base comprising:
  i) a floor having a first cross-sectional area;
  ii) a lower tier of base wall panels, extending from said floor, said lower tier bounding a second cross-sectional area at an uppermost height of said lower tier of base wall panels, said second cross-sectional area being greater than or equal to said first cross-sectional area; and
  iii) an upper tier of base wall panels, extending from said lower tier, said upper tier bounding a third cross-sectional area at a lowermost height of said upper tier and a fourth cross-sectional area at an uppermost height of said upper tier, said third cross-sectional area being greater than said second cross-sectional area, said fourth cross-sectional area being greater than or equal to said third cross-sectional area; and b) a removable cover comprising:
  i) a top surface having a fifth cross-sectional area, said fifth cross-sectional area being greater than said second cross-sectional area and less than said third cross-sectional area; and
  ii) a tier of cover walls extending from said top surface, said tier bounding a sixth cross-sectional area, said sixth cross-sectional area being greater than or equal to said fifth cross-sectional area and less than said fourth cross-sectional area;

c) wherein said cover is removably disposed in an orientation selected from the group consisting of:
  i) above said base with said top surface adjacent said uppermost height of said lower tier of base wall panels;
  ii) above said base with said top surface disposed with said tier of cover walls adjacent said uppermost height of said upper tier and said top surface disposed above said tier of cover walls; and
  iii) below said base with said top surface adjacent said floor.

23. A floppy disk container comprising:

a) a base of resilient plastic material, said base comprising a rectangular, substantially planar floor surmounted by four base walls including a front base wall, two side base walls, and a rear base wall, each of said four base walls comprising upper and lower panels, said four base walls being surmounted by a lip, said lip including a hinge housing in the vicinity of said rear wall; and b) a removable cover of transparent plastic material, said cover comprising a rectangular, substantially planar top with four cover walls extending from said top and a hinge pin mounted on one of said cover walls, said cover disposable in first and second orientations, said cover in said first orientation fitting securely atop said base with said hinge pin rotatably disposed in said hinge housing, said cover in said second orientation being nestable entirely within said base with said hinge pin disposed in said hinge housing, said base being at least partially nestable within said cover in said second orientation;

c) wherein said base is fabricated of relatively resilient material and said cover is fabricated of relatively brittle material relative to said base, so that when said cover is removably nested within said base, said base deforms to absorb a horizontal impact prior to transferring a force to said cover.

24. The container of claim 1 wherein:

said base includes:
   a substantially planar floor member; and
   a plurality of base walls extending from said floor member, at least one of said base walls of said plurality comprising a substantially planar lower panel portion connected to said floor, a substantially planar upper panel portion connected to said lower panel portion, said lower and upper panel portions being noncoplanar and offset from one another by a ledge; and said cover includes:
   a substantially planar top surface member; and
   a plurality of substantially planar cover walls; and said top surface of said cover being adjacent to said ledge of said base when said cover is nested within said base in said second orientation.

25. The container of claim 24 further comprising engaging means for providing cooperation between said base and said cover, said engaging means securely engaging said cover atop said base to provide closure of said container in said first orientation of said cover, said engaging means securely engaging said cover nested within said base in said second orientation of said cover.

* * * * *